(12) United States Patent
Darcissac et al.

(10) Patent No.: US 10,065,164 B2
(45) Date of Patent: Sep. 4, 2018

(54) METHOD FOR COMPLETELY EMPTYING A CATALYTIC REACTOR

(71) Applicant: Eurecat S.A, La Voulte-sur-Rhône (FR)

(72) Inventors: Jean Darcissac, Saint Georges les Bains (FR); Vincent Thevenet, Allex (FR); Romain Vial, Vernaison (FR); Lilian Bernard, Montelimar (FR); Pierre Dufresne, Acouste sur Sye (FR)

(73) Assignee: Eurecat S.A., La Voulte-sur-Rhöne (FR)

( * ) Notice: Subject to any disclaimer, the term of this patent is extended or adjusted under 35 U.S.C. 154(b) by 89 days.

(21) Appl. No.: 15/184,611

(22) Filed: Jun. 16, 2016

(65) Prior Publication Data

US 2016/0375417 A1    Dec. 29, 2016

(30) Foreign Application Priority Data

Jun. 26, 2015   (FR) ...................... 15 55946

(51) Int. Cl.
| | |
|---|---|
| *B65G 69/08* | (2006.01) |
| *B01J 8/00* | (2006.01) |
| *B08B 9/087* | (2006.01) |

(52) U.S. Cl.
CPC ............. *B01J 8/002* (2013.01); *B01J 8/003* (2013.01); *B01J 8/0015* (2013.01); *B65G 69/08* (2013.01);
(Continued)

(58) Field of Classification Search
CPC .. B01J 8/002; B65G 69/08; B65G 2814/0217; B65G 2814/0223; B08B 9/0808; B08B 9/087; B65D 90/0083
(Continued)

(56) References Cited

U.S. PATENT DOCUMENTS 3,179,264 A  *  4/1965  Tallquist ................ B65G 65/00
                                                   198/578
3,246,776 A  *  4/1966  Spencer .............. A01F 25/2009
                                                   15/246.5
(Continued)

FOREIGN PATENT DOCUMENTS

DE    102006061810 A1  *  7/2008  ............. B65G 69/08
EP        1491463 A2  *  12/2004  ............. B65G 69/08
(Continued)

OTHER PUBLICATIONS

French Search Report issued in French Application No. 1555946, filed Jun. 26, 2015.

*Primary Examiner* — James W Keenan
(74) *Attorney, Agent, or Firm* — Saul Ewing Arnstein & Lehr LLP; Peter C. Lauro, Esq.

(57) ABSTRACT

The present invention provides a method for emptying a reactor containing at least one bed of spent catalyst particles, wherein the reactor comprises at least one dump tube that opens into the reactor. The method comprises the steps of:
  (a) causing a portion of the bed of spent catalyst particles to flow out of the reactor via the dump tube; and
  (b) expelling the remainder of the spent catalyst particles from the reactor by driving the remainder of the spent catalyst particles toward the opening of the dump tube using a removable device comprising at least one rotary brush fixed to the end of an articulated arm introduced into the reactor via the dump tube.

19 Claims, 2 Drawing Sheets

Figure 1:
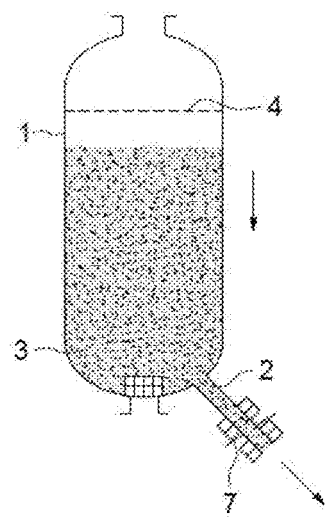

(52) U.S. Cl.
CPC .......... *B01J 2208/00761* (2013.01); *B01J 2208/00769* (2013.01); *B08B 9/087* (2013.01); *B65G 2814/0217* (2013.01)

(58) Field of Classification Search
USPC ........ 15/104.096, 104.16; 414/209, 314, 804
See application file for complete search history.

(56) References Cited

U.S. PATENT DOCUMENTS

| | | | |
|---|---|---|---|
| 5,840,260 A * | 11/1998 | Easterly | B01J 8/0025 |
| | | | 134/21 |
| 6,203,766 B1 | 3/2001 | Kawakami et al. | |
| 7,959,870 B2 | 6/2011 | Yanokuchi et al. | |
| 8,397,334 B2 * | 3/2013 | Ryffel | B08B 9/0808 |
| | | | 134/6 |
| 2016/0375418 A1 * | 12/2016 | Darcissac | B01J 8/0015 |
| | | | 414/804 |

FOREIGN PATENT DOCUMENTS

| | | | | |
|---|---|---|---|---|
| FR | 2825990 A1 * | 12/2002 | ............ | B65G 69/08 |
| JP | 61217438 A * | 9/1986 | | |
| WO | WO87/02337 A1 * | 4/1987 | ............ | B65G 69/08 |
| WO | 199420396 A1 | 9/1994 | | |
| WO | 2004058572 A1 | 7/2004 | | |

\* cited by examiner

METHOD FOR COMPLETELY EMPTYING A CATALYTIC REACTOR

This application claims priority to French Application No. 1555946, filed Jun. 26, 2015. The entire content of the aforementioned patent application is incorporated herein by reference.

The subject of the present invention is a method that allows a reactor containing particles of catalyst to be emptied completely.

The method according to the invention is particularly suited to completely emptying an industrial reactor of the particles of spent catalyst that it contains.

Numerous industrial processes, notably in the fields of chemistry, petrochemistry and oil refinery, employ solid catalysts in the form of small-sized particles.

These catalyst particles are generally placed in the reactor in the form of one or more beds (or layers of catalyst) which are superposed and each deposited on a support tray.

As it is used in the reactor, the catalyst becomes gradually deactivated, and its activity decreases, so that it needs to be withdrawn from the reactor and replaced with fresh active catalyst. Thus, industrial reactors need to be shut down regularly in order to renew the bed or beds of catalyst. This operation is performed in two phases: the emptying of the reactor so as to remove the spent catalyst therefrom, followed by the recharging thereof with active catalyst. These two operations need to be performed as effectively and quickly as possible, so as to minimize reactor downtime, for obvious economic reasons.

Furthermore, the emptying operation needs to be complete, so that the entirety of the spent catalyst is eliminated in full from the reactor. This is because incomplete emptying would mean leaving some spent catalyst in the reactor, at the expense of active catalyst, something that would be particularly detrimental to the efficiency of the unit and that is, in practice, unacceptable.

However, completely emptying an industrial reactor of the spent catalyst particles it contains is an operation that, for various reasons, is tricky and problematic.

First of all, the spent catalyst particles have a tendency to be sticky and to agglomerate with one another fairly strongly, thereby making removing them from the reactor significantly more complicated.

Secondly, the spent catalyst often contains an active phase that may be reactive in contact with the air, such as, for example, active phases containing metal sulphides. Because of the presence of these compounds, the spent catalyst may spontaneously self-heat very suddenly and to a significant extent or even, in some cases, may self-ignite upon contact with the air. Most corresponding catalysts are classified, in accordance with a United Nations standard, either as self-heating or as pyrophoric.

Handling spent catalyst is therefore a tricky matter and may prove hazardous, and emptying the reactor is generally performed under an inert atmosphere (usually under nitrogen).

In order to empty a reactor containing spent particles of catalyst, there are a number of techniques known from the prior art:

Gravity Flow Emptying;

This is performed by opening the lateral dump tube or tubes situated at the bottom of the reactor (or the bottom of each catalyst bed in the case of a multi-bed reactor), so as to allow the catalyst to flow out of the reactor under the action of its weight. In the best cases this allows 80 to 85% of the spent catalyst contained in the reactor to be extracted.

However, the catalyst may also be sticky and not flow well if at all, notably when agglomerations of spent catalyst have formed. When that happens, it is necessary to resort to various techniques of unplugging the bed so as to cause the catalyst particles to start to flow.

In any case, even in the best scenarios, at the end of the gravity flow emptying operation a quantity of spent catalyst, which in general represents from 15 to 20 wt % of the initial bed of catalyst and which typically corresponds to the angle of repose of this divided solid, remains inside the reactor. The remainder of the catalyst inside the reactor at the end of the gravity flow emptying operation is commonly referred to as the "dig out".

Human intervention is then required in order to remove the dig out: an operator goes down inside the reactor and manually removes the remainder, for example using a shovel, to the dump tube. This operation is particularly hazardous: the reactor is under an atmosphere of nitrogen, given the self-heating nature of the spent catalyst, and fatal accidents regularly occur during these operations. There is therefore nowadays a desire within the industry to limit, if not to completely eliminate, such human interventions inside the reactors.

Suck-out Emptying:

This is generally done from the top of the reactor. The top of the reactor is opened, under a purge of nitrogen, the charge distribution tray generally present above the bed is removed, and the catalytic bed is sucked out by means of an industrial extractor, compensated for with nitrogen.

The head of the extractor is generally guided by an operator in order to empty out the catalyst layer by layer. Solid and gas are separated via a cyclone. This widely used technique does have a number of disadvantages: high cost; damage to the catalyst particles sometimes going so far as meaning that these cannot be regenerated for later use; the presence of an operator inside the reactor, at least for the finishing operations, generating the same safety problems as those described hereinabove.

Examples of this type of technique are described in documents U.S. Pat. No. 7,959,870 and WO 2004/058572.

Wet Gravity Emptying:

This technique, which is somewhat experimental and less commonly used, makes it possible to avoid any human intervention in the reactor under an inert atmosphere. It consists in filling the reactor with water and in emptying the wet catalyst/water mixture via the lateral dump tubes situated at the bottom of the reactor.

However, it does have major disadvantages: it generates a great deal of dirty water and compromises the possibility of later regenerating the spent catalyst so that it can be reused.

There has therefore long been felt a significant need to have innovative solutions that will allow industrial reactors to be emptied completely, rapidly, effectively and safely of the spent catalyst particles they contain.

The applicant company has now discovered a novel technique for emptying reactors containing spent catalyst particles that makes it possible to overcome the disadvantages of the methods of the prior art.

One subject of the present invention is a method for emptying a reactor containing at least one bed of spent catalyst particles and comprising at least one dump tube, which opens into the reactor at the bottom of the said bed of particles or underneath the latter. The method according to the invention comprises the following successive steps:

a first step consisting in causing a proportion of the bed of catalyst to flow out of the reactor via the said dump tube, then a second step of expelling the remainder of the catalyst from the reactor, this step being performed by driving towards the opening of the dump tube the particles of catalyst that have remained in the reactor at the end of the first step, using a removable device comprising at least one rotary brush fixed to the end of an articulated arm introduced into the reactor via the said dump tube.

The method according to the invention makes it possible to empty the reactor of its charge of spent catalyst in a particularly complete, effective and rapid way.

The method according to the invention also makes it possible to avoid any human intervention inside the reactor, and allows a very significant improvement in the safety of the operations of dumping the spent catalyst.

The method according to the invention finally makes it possible to preserve the properties of the spent catalyst and limit the damage it sustains as it is dumped, something which is essential when the catalyst is then going to be regenerated with a view to subsequent reuse.

The first step in the method according to the invention is to cause a proportion of the catalyst bed to flow out of the reactor through the dump tube, by opening the latter.

This first step is preferably performed under gravity, namely by causing a proportion of the bed of catalyst to flow under gravity out of the reactor via the said dump tube.

To "flow under gravity" means that the catalyst flows from the reactor during the first step under the action of its own weight and is neither driven by mechanical pushing means inside the reactor (for example by an operator), nor sucked from the reactor by particle extraction means.

This is typically a conventional gravity flow such as those known from the prior art.

The flow may also be assisted, which means to say that during the first step, means that facilitate the exiting of the catalyst from the reactor are employed, for example by injecting pressurized gas into the reactor.

Moreover, notably in cases in which catalyst flow does not occur spontaneously when the dump tube is opened, it is possible, immediately prior to the first step, to resort to means of deagglomerating the bed of catalyst. Such means are known from the prior art. They may in particular involve injecting pressurized gas (typically pressurized $CO_2$). These means make it possible to cause the particles of catalyst to begin to flow, after which the catalyst, in the case of gravity flow, is left to flow under the action of its own weight alone.

Thus, according to one embodiment of the invention, the said first step is preceded by a preliminary step of deagglomerating the catalyst, which is preferably performed by injecting a pressurized inert gas such as carbon dioxide or nitrogen into the bed of catalyst.

The present invention applies to reactors which are provided with at least one dump tube which opens into the reactor at the bottom part of the bed of particles or underneath this bed.

The dump tube may be horizontal, or inclined downwards. It is preferably inclined downwards. In that case, the dump tube preferably has an angle of inclination with respect to the vertical ranging from 0 to 75 degrees, more preferentially 10 to 60 degrees.

During the first step of the method according to the invention, a generally substantial proportion of the bed of spent catalyst is extracted from the reactor, typically more than 50 wt % of the initial bed, and in general ranging from 60 to 95 wt % of the initial bed of catalyst, more particularly from 70 to 90 wt % of the initial bed of catalyst.

The remainder of the catalyst (or "dig out") is then removed completely from the reactor by means of the second step of the method of the invention.

This second step uses a removable device comprising a rotary brush fixed to the end of an articulated arm introduced into the reactor via the said dump tube. This brush rotates about an axis, preferably an orientable axis, at a speed that can be variable.

This rotary brush allows the remainder of catalyst to be driven towards the opening of the dump tube, namely towards the end of the dump tube that opens into the reactor.

Thus, during this second step, the remainder of spent catalyst is completely expelled from the reactor via the dump tube.

According to the present invention, the rotary brush is fixed to the end of an articulated arm introduced into the reactor via the dump tube, and this allows the brush to be moved in all possible directions inside the reactor (at least three degrees of freedom in translation and/or in rotation in the movements of the brush).

The articulated arm allows the brush to be introduced into and moved around inside the reactor. According to one embodiment, the articulated arm is telescopic.

The articulated arm is removable and transportable. To implement the second step, it is advantageously fixed to the dump tube.

The movements of the brush inside the reactor can be controlled by means of guidance of the articulated arm. Suitable means of guidance may for example consist of a set of motors.

These means of guidance may be controlled manually, automatically or semiautomatically.

When control of the means of guidance of the articulated arm is manual, an operator outside the reactor controls the movements of the brush inside the reactor by operating these guide means.

When control of the means of guidance of the articulated arm is automatic, the guide means are controlled by a computer which runs a program for moving the brush around inside the reactor. The movement program may be predefined, which means that the movements of the brush during the course of the second step have been calculated beforehand, so as to optimize the removal of the "dig out". The movement program may also be designed in such a way as to organize a random movement of the brush inside the reactor.

Control of the means of guidance of the articulated arm may also be semiautomatic, which means to say controlled in part by a computer program and in part by an operator.

Furthermore, according to one particularly advantageous embodiment of the invention, means of detecting the position of the brush are present inside the reactor. Such means make it possible at any moment to know the exact position of the brush inside the reactor, and, if appropriate, to optimize the movements thereof.

These detection means may comprise computation software which gradually determines the position of the brush in the reactor taking account of the movements of the articulated arm (simulating the position of the brush using software that compiles the control data in order to deduce the position of the said brush).

Other detection means include for example radar detection or ultrasound detection systems; systems employing one or more accelerometers, one or more GPSs; viewing systems using one or more cameras.

According to a preferred embodiment, the said detection means comprise one or more camera(s) which allows(allow) the position of the brush in the reactor to be viewed. Such a camera may for example be positioned on the internal wall of the reactor and/or on the articulated arm. Various types of camera can be used for this purpose, notably including night vision cameras and infrared cameras.

Such a camera may also make it possible if need be to locate the remainder of the catalyst, and control the movements of the brush accordingly.

The brush used in the present invention advantageously comprises a collection of filaments (or bristles), of flails or even of strips, fixed to a support and which may have greater or lesser stiffness, preferably being relatively stiff. The brush may also be made up of a chain fixed to a support.

The brush may be made from any suitable material such as, for example and nonlimitingly, polymer materials, metallic materials (for example stainless steel), composites and mixtures of such materials.

The brush may have relatively diverse shapes and sizes. It is preferably cylindrical in shape.

As it rotates, the brush rubs against the surface of the remainder of the catalyst (dig out), and makes it possible to detach the particles and expel them towards the opening of the dump tube.

According to the invention, the brush is a rotary brush, which means that it rotates about an axis. The axis of rotation of the brush may be fixed or orientable. It may notably be orientable in rotation about the axis of the part of the articulated arm to which the brush is attached. This makes it possible to control the position of the axis of rotation of the brush and to adjust this so that this axis is parallel to the axis of the dump tube as little as possible; being parallel would have the effect of driving the particles of catalyst towards the lateral walls of the reactor rather than towards the opening of the dump tube.

The rotational speed of the brush may be fixed or variable. It is preferably variable, this making it possible to vary it as the second step progresses. The rotation speed of the brush may also be adjusted to take account of the size of the catalyst particles, and the extent to which they tend to agglomerate.

If the reactor comprises several beds of catalyst, each bed can be dumped using the method according to the invention. That entails there being on the reactor at least one dump tube at the bottom of each bed of catalyst.

When the spent catalyst to be removed from the reactor is reactive with the air, for example when it is of a self-heating nature, the method according to the present invention is typically performed by placing the reactor under an inert gas and then keeping it under that inert gas, that is to say that the catalyst removed from the reactor during the two steps according to the invention is progressively replaced with an inert gas, such as nitrogen for example. This introduction of inert gas into the reactor as the reactor is gradually emptied may be performed for example from the top or from the bottom of the reactor.

Figure 2:
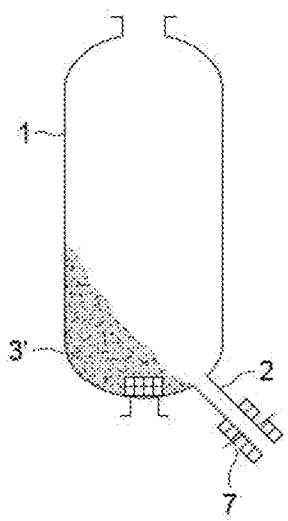
Figure 3:
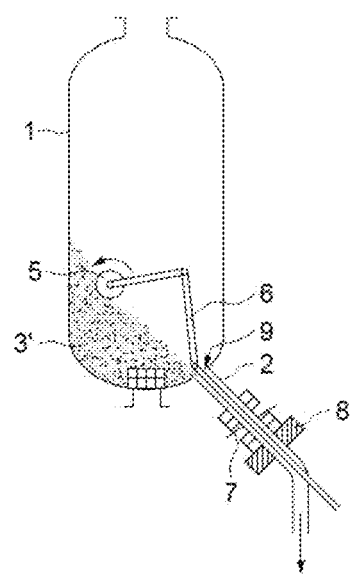

The present invention will now be illustrated in greater detail and nonlimitingly using the attached figures in which:

FIG. 1 illustrates implementation of the first step of the method according to the invention in an industrial reactor containing a bed of spent catalyst, FIG. 2 shows the same reactor at the end of the first step, FIG. 3 illustrates implementation of the second step of the method according to the invention, in the same reactor.

FIG. 1 shows an industrial reactor 1 of the columns type, containing a bed 3 of spent catalyst particles. The reactor 1 comprises a downwardly inclined dump tube 2, with an angle of inclination with respect to the vertical of around 45 degrees. The tube 2 opens into the reactor 1 at the bottom of the bed 3 of particles.

In order to allow the first step of the method according to the invention to be implemented, the dump tube 2 has been opened by opening the dump valve 7, so that the particles of catalyst flow out of the reactor 1 under gravity flow, via the tube 2.

The dotted lines 4 show the initial upper level of the bed of catalyst 3 before the gravity flow was initiated, and the arrows in FIG. 1 show the direction in which the catalyst flows.

FIG. 2 illustrates the same reactor 1 at the end of the first gravity flow emptying step, and shows that at the end of this step the reactor 1 still contains remainder 3' of spent catalyst which here represents approximately 15 wt % of the initial bed of catalyst, and which corresponds to the angle of repose of the mass of particles of catalyst. The remainder 3' of catalyst corresponds to the "dig out" which cannot be removed simply under gravity flow emptying.

As illustrated in FIG. 3, according to the second step of the method according to the invention, the remainder 3' of the catalyst is then expelled from the reactor 1 by means of a removable device comprising a rotary brush 5 which, by rotating, drives the grains of catalyst towards the opening 9 of the tube 2. In the embodiment illustrated, this brush has the shape of a flat cylinder. The brush 5 is fixed to the end of an articulated arm 6 introduced into the reactor 1 via the dump tube 2.

The articulated arm 6 allows the brush 5 to be moved in all possible directions inside the reactor 1.

The movements of the brush 5 in the reactor 1 are controlled by motorized means 8 of guidance of the articulated arm, which are present outside of the reactor and are fixed to the flange at the outlet of the dump tube 2.

The invention claimed is:

1. A method for emptying a reactor containing at least one bed of spent catalyst particles, wherein the reactor comprises at least one dump tube that opens into the reactor at the bottom of the bed of particles or underneath the latter, the method comprising the steps of:
   (a) causing a portion of the bed of spent catalyst particles to flow out of the reactor via the dump tube;
   (b) introducing into the reactor a removable device via the dump tube that opens into the reactor at the bottom of the bed of particles or underneath latter, wherein the removable device comprises at least one rotary brush fixed to the end of an articulated arm; and
   (c) expelling the remainder of the spent catalyst particles from the reactor without human intervention inside the reactor by using the removable device to drive the remainder of the spent catalyst particles toward the opening of the dump tube.

2. The method of claim 1, wherein step (a) is performed under gravity such that the portion of the bed of spent catalyst particles flows out of the reactor under gravity via the dump tube.

3. The method of claim 1, wherein during the course of step (a), the portion of the bed of spent catalyst particles extracted from the reactor is greater than 50 wt % of the initial bed of catalyst particles.

4. The method of claim 3, wherein the portion of the bed of spent catalyst particles extracted from the reactor ranges from 60 to 95 wt % of the initial bed of catalyst particles.

5. The method of claim 3, wherein the portion of the bed of spent catalyst particles extracted from the reactor ranges from 70 to 90 wt % of the initial bed of catalyst particles.

6. The method of claim 1, wherein during the course of step (b), movement of the brush inside the reactor is controlled by means for guiding the articulated arm.

7. The method of claim 6, wherein the means for guiding the articulated arm is present outside the reactor.

8. The method of claim 6, wherein the means for guiding the articulated arm is controlled manually, automatically or semiautomatically.

9. The method of claim 1, wherein the articulated arm is telescopic.

10. The method of claim 1, wherein the reactor further comprises means for detecting the position of the rotary brush present inside the reactor.

11. The method of claim 10, wherein the detection means comprises one or more cameras positioned on an internal wall of the reactor and/or on the articulated arm.

12. The method of claim 1, wherein the rotary brush is of cylindrical shape.

13. The method of claim 1, wherein the rotary brush has an axis of rotation that is fixed or orientable.

14. The method of claim 13, wherein the axis of rotation of the rotary brush is orientable.

15. The method of claim 1, wherein the dump tube is horizontal or inclined downwards.

16. The method of claim 15, wherein the dump tube is inclined downwards, with an angle of inclination with respect to the vertical from 0 to 75 degrees.

17. The method claim 15, wherein the dump tube is inclined downwards, with an angle of inclination with respect to the vertical from 10 to 60 degrees.

18. The method of claim 1, further comprising, prior to step (a), deagglomerating the catalyst by injecting a pressurized inert gas into the bed of spent catalyst particles.

19. The method of claim 18, wherein the inert gas is carbon dioxide or nitrogen.

* * * * *